United States Patent
Flores Renteria et al.

(10) Patent No.: US 12,187,652 B2
(45) Date of Patent: Jan. 7, 2025

(54) CERAMIC MATERIAL, POWDER, AND LAYER SYSTEM COMPRISING THE CERAMIC MATERIAL

(71) Applicant: Siemens Energy Global GmbH & Co. KG, Bayern (DE)

(72) Inventors: Arturo Flores Renteria, Berlin (DE); Dimitrios Zois, Berlin (DE)

(73) Assignee: Siemens Energy Global GmbH &Co. KG, Bayern (DE)

( * ) Notice: Subject to any disclaimer, the term of this patent is extended or adjusted under 35 U.S.C. 154(b) by 217 days.

(21) Appl. No.: 17/770,821

(22) PCT Filed: Mar. 18, 2020

(86) PCT No.: PCT/EP2020/057029
§ 371 (c)(1),
(2) Date: Apr. 21, 2022

(87) PCT Pub. No.: WO2021/093999
PCT Pub. Date: May 20, 2021

(65) Prior Publication Data
US 2022/0371966 A1    Nov. 24, 2022

(30) Foreign Application Priority Data
Nov. 12, 2019  (DE) .................. 10 2019 217 445.0

(51) Int. Cl.
*C04B 37/02*   (2006.01)
*C04B 35/48*   (2006.01)
*C04B 37/00*   (2006.01)

(52) U.S. Cl.
CPC ............ *C04B 37/023* (2013.01); *C04B 35/48* (2013.01); *C04B 37/001* (2013.01);
(Continued)

(58) Field of Classification Search
CPC .................. C04B 35/48; C04B 37/001; C04B 2235/3206; C04B 2235/3208;
(Continued)

(56) References Cited

U.S. PATENT DOCUMENTS 5,834,070 A * 11/1998 Movchan .............. C23C 14/027
427/126.3
6,812,176 B1 * 11/2004 Zhu ........................ C04B 35/486
501/103

(Continued)

FOREIGN PATENT DOCUMENTS

CN      101045631 A    10/2007
DE      102017216756 A1  3/2019
(Continued)

OTHER PUBLICATIONS

[NPL-1] Appleby (RU 2008151785 A), Jul. 10, 2010 (EPO—machine translation to English). (Year: 2010).*
(Continued)

*Primary Examiner* — David Sample
*Assistant Examiner* — Donald M Flores, Jr.
(74) *Attorney, Agent, or Firm* — Wolter Van Dyke Davis, PLLC

(57) ABSTRACT

An improved ceramic material for heat insulation with selection of specific stabilizers and adapted proportions, includes zirconium oxide with 0.2 wt. % to 8.0 wt. % of the base stabilizers: yttrium oxide ($Y_2O_3$), hafnium oxide ($HfO_2$), cerium oxide ($CeO_2$), calcium oxide (CaO), and/or magnesium oxide (MgO), wherein at least yttrium oxide ($Y_2O_3$) is used, and optionally at least one of the additional stabilizers: 0.2 wt. % to 20 wt. % of erbium oxide ($Er_2O_3$) and/or ytterbium oxide ($Yb_2O_3$).

13 Claims, 2 Drawing Sheets

(52) U.S. Cl.
CPC ............... *C04B 2235/3206* (2013.01); *C04B 2235/3208* (2013.01); *C04B 2235/3225* (2013.01); *C04B 2235/3229* (2013.01); *C04B 2235/3246* (2013.01); *C04B 2237/121* (2013.01); *C04B 2237/122* (2013.01); *C04B 2237/123* (2013.01); *C04B 2237/348* (2013.01); *C04B 2237/40* (2013.01); *C04B 2237/64* (2013.01)

(58) Field of Classification Search
CPC .... C04B 2235/3225; C04B 2235/3229; C04B 2235/3246; C04B 2237/348; C04B 2237/40; C04B 2237/64
See application file for complete search history.

(56) References Cited

U.S. PATENT DOCUMENTS

| | | | |
|---|---|---|---|
| 6,887,595 B1 | 5/2005 | Darolia | |
| 6,893,994 B2 | 5/2005 | Wallar | |
| 7,129,192 B2 | 10/2006 | Boussant-Roux | |
| 9,573,850 B2 | 2/2017 | Citti | |
| 2005/0142395 A1 | 6/2005 | Spitsberg | |
| 2006/0040127 A1 | 2/2006 | Spitsberg | |
| 2007/0082131 A1* | 4/2007 | Doesburg | C23C 14/083 427/454 |
| 2008/0160172 A1 | 7/2008 | Taylor et al. | |
| 2021/0395150 A1 | 12/2021 | Flores Renteria et al. | |

FOREIGN PATENT DOCUMENTS

| | | | | |
|---|---|---|---|---|
| DE | 102018215223 A1 | | 3/2020 | |
| EP | 1536039 A1 | | 6/2005 | |
| EP | 1550644 A1 | | 7/2005 | |
| EP | 1627862 A1 | | 2/2006 | |
| EP | 1772441 A1 | | 4/2007 | |
| JP | 2005200291 A | | 7/2005 | |
| JP | 2009538399 A | | 11/2009 | |
| RU | 2299926 C2 | | 5/2007 | |
| RU | 2324670 C2 | | 5/2008 | |
| RU | 2008151785 A | * | 7/2010 | ............ C01G 25/00 |
| RU | 2436752 C2 | | 12/2011 | |
| RU | 2456254 C2 | | 7/2012 | |
| WO | 2007139694 A2 | | 12/2007 | |
| WO | 2019057424 A1 | | 3/2019 | |

OTHER PUBLICATIONS

Huang, Xia et al.: Experimental study of the thermal conductivity of metal oxides co-doped yttria stabilized zirconia. In: Materials science and engineering B, vol. 149, 2008, No. 1, S. 63-72.—ISSN 0921-5107; 2008.

PCT International Search Report and Written Opinion of International Searching Authority mailed Jul. 7, 2020 corresponding to PCT International Application No. PCT/EP2020/057029 filed Mar. 18, 2020.

"Thermal Spraying Materials", edited by Zhang Ping, National Defense Industry Press, p. 183, 01, 2006 1st edition of 1st printing [English machine translation attached].

English-language version of the CN Office Action from corresponding Chinese Patent Application for Invention No. CN202080078253.4 referencing the Non-Patent Literature citation 1 as publicly known common sense evidence.

* cited by examiner

CERAMIC MATERIAL, POWDER, AND LAYER SYSTEM COMPRISING THE CERAMIC MATERIAL

CROSS REFERENCE TO RELATED APPLICATIONS

This application is the US National Stage of International Application No. PCT/EP2020/057029 filed 18 Mar. 2020, and claims the benefit thereof. The International Application claims the benefit of German Application No. DE 10 2019 217 445.0 filed 12 Nov. 2019. All of the applications are incorporated by reference herein in their entirety.

FIELD OF INVENTION

The invention relates to a ceramic material and to powder produced therewith that can be used for ceramic layer systems.

BACKGROUND OF INVENTION

Ceramics in general have a high thermal stability and are therefore often used as ceramic coatings on high-temperature components, such as turbines, especially gas turbines.

The constant aim is to improve the heat insulation properties of the ceramic material.

SUMMARY OF INVENTION

It is therefore an object of the invention to solve the problem identified above.

The object is achieved by means of a ceramic, a ceramic powder, and a system of layers as claimed.

Ceramic layers based on zirconium oxide with stabilizers are known; here, fully stabilized zirconium oxide is often used, owing to its better thermal stability.

The objective of the concept, however, is to use partially stabilized zirconium oxide having an improved stability, especially thermal stability.

DETAILED DESCRIPTION OF INVENTION

The zirconium oxide is stabilized with 0.2 wt % to 8 wt %, more particularly with 0.2 wt % to 6.0 wt %, of base stabilizers: yttrium oxide, hafnium oxide, cerium oxide, calcium oxide and/or magnesium oxide and optionally with additional stabilizers—0.2 wt % to 20 wt % of erbium oxide and/or ytterbium oxide.

Yttrium oxide is used in any case and at least one of the base stabilizers hafnium oxide, cerium oxide, calcium oxide and/or magnesium oxide is used.

This ceramic composition may be prepared as a powder, and so further additions, as in the use of abrasive layers, comprise cubic boron nitride or other abrasive particles.

In a layer system $1^I$ (FIG. 1) a ceramic layer $10^I$ is applied to metal, the substrate 4 present, in the case of nickel- or cobalt-based superalloys used preferably, being a metallic adhesion layer 7 which forms aluminum oxide (TGO; not shown), with the metallic adhesion promoter layer constituting preferably an aluminide, platinum-aluminide or, as a basis, an NiCoCrAl—X alloy, optionally with x=Ta, Re, Fe and/or Si.

The ceramic layer of the ceramic material in accordance with the invention may be produced by means of EB-PVD, plasma spraying (APS, etc.), etc. and has a columnar structure or a segmented structure.

The ceramic layers $10^{II}$, $10^{III}$, $10^{IV}$ (FIGS. 2-4) preferably has a layer thickness of 100 µm to 1000 µm.

Figure 1:
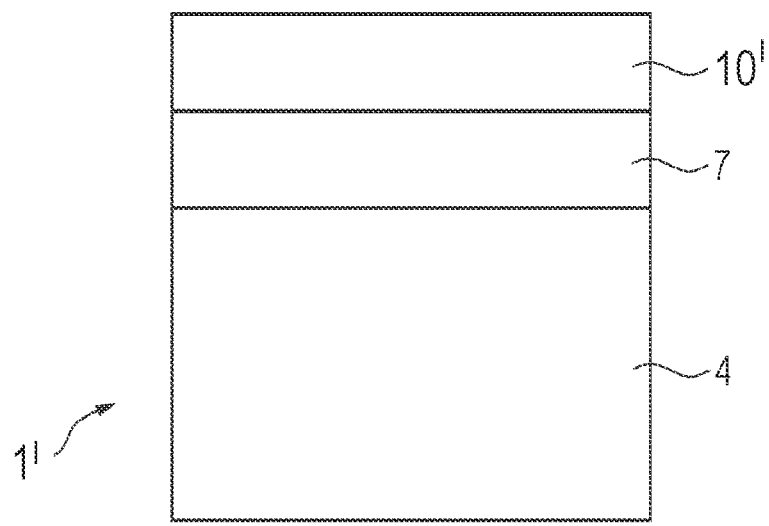
FIGS. 1 to 4 show exemplary embodiments of the invention.
Figure 2:
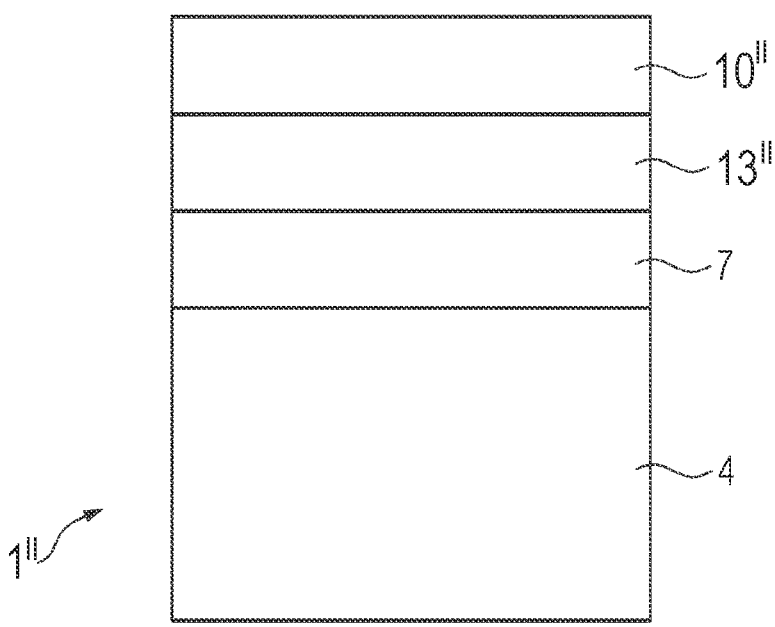

As shown in FIG. 2, in a layer system $1^{II}$, a ceramic layer $10^{II}$ as in FIG. 1 may also have a ceramic sublayer $13^{II}$, the layer thickness of which, however, is at least 20% thinner in configuration than that of the ceramic material of the invention in the ceramic layer $10^{II}$.

The ceramic sublayer $13^{II}$ preferably comprises 8YSZ, i.e., zirconium oxide stabilized with 3 mol % to 4 mol % of yttrium, and is therefore distinctly different from the material of the ceramic layer $10^{II}$.

Figure 3:
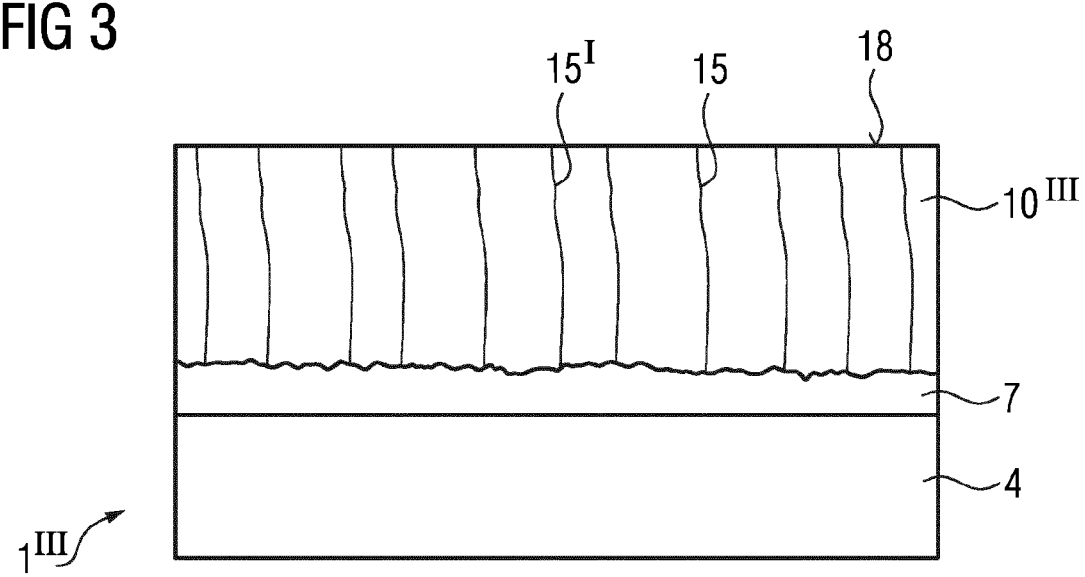
Figure 4:
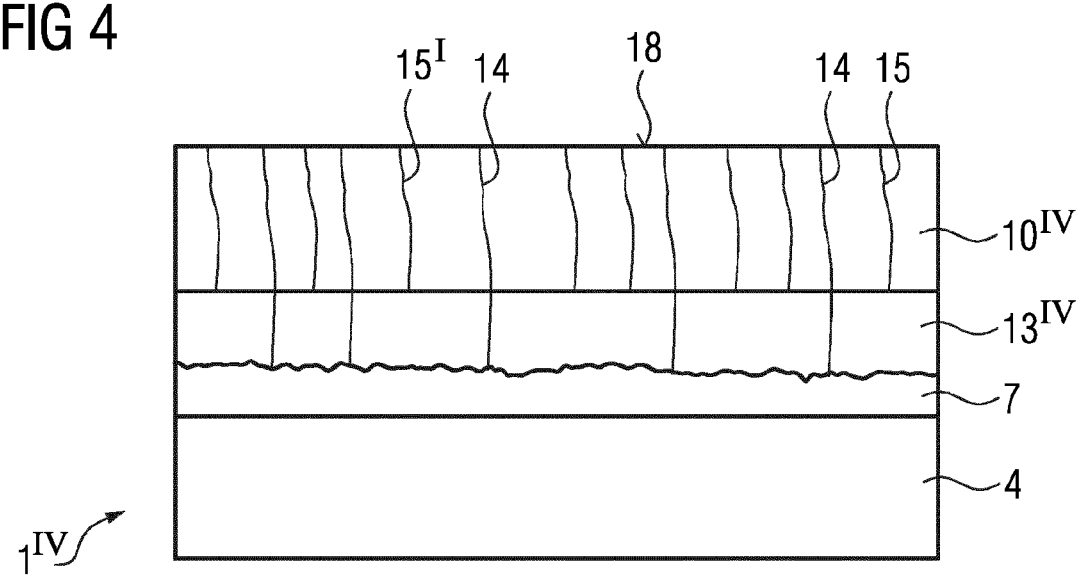

FIGS. 3 and 4 show further examples of layer structures $1^{III}$, $1^{IV}$ of the invention.

According to FIG. 3, in comparison to FIG. 1, there is a segmented ceramic layer $10^{III}$ of a layer system $1^{III}$, which comprises numerous, relatively long and vertical cracks 15, $15^I$, starting from the surface 18 of the outermost ceramic layer $10^{III}$, and extending very largely over the entire ceramic layer thickness, here in particular up to the metallic adhesion layer 7 or the TGO thereof (not shown).

A layer system $1^{IV}$ may also comprise a ceramic attachment layer $13^{IV}$ (FIG. 4) for attachment of the outermost layer $10^{IV}$ of a thermal barrier coating (TBC), in which case the attachment layer $13^{IV}$ may be configured as described in FIG. 2.

The outermost ceramic layer $10^{IV}$ is more particularly configured like the outermost layer $10^{III}$ in FIG. 3.

In the ceramic attachment layer $13^{IV}$, however, cracks 14 extend, preferably likewise vertical, which extend through both ceramic layers $10^{IV}$, $13^{IV}$.

The relatively long cracks have been formed by specific process parameters or production methods, and do not represent cracks between multiple grains.

Exemplary Embodiments $ZrO_2+Y_2O_3+CeO_2$
$ZrO_2+Y_2O_3+MgO$
$ZrO_2+Y_2O_3+HfO_2$
$ZrO_2+Y_2O_3+CaO$
$ZrO_2+Y_2O_3+CeO_2+MgO$
$ZrO_2+Y_2O_3+MgO+HfO_2$
$ZrO_2+Y_2O_3+HfO_2+CaO$
$ZrO_2+Y_2O_3+CeO_2+HfO_2$
$ZrO_2+Y_2O_3+MgO+CaO$
$ZrO_2+Y_2O_3+CeO_2+CaO$
$ZrO_2+Y_2O_3+CaO+CeO_2+HfO_2$
$ZrO_2+Y_2O_3+HfO_2+MgO+CaO$
$ZrO_2+Y_2O_3+CeO_2+MgO+CaO$
$ZrO_2+Y_2O_3+CeO_2+MgO+HfO_2$
$ZrO_2+Y_2O_3+HfO_2+CaO+CeO_2+MgO$
$ZrO_2+Y_2O_3+CeO_2+Yb_2O_3$
$ZrO_2+Y_2O_3+MgO+Yb_2O_3$
$ZrO_2+Y_2O_3+HfO_2+Yb_2O_3$ (particularly preferred)
$ZrO_2+Y_2O_3+CaO+Yb_2O_3$
$ZrO_2+Y_2O_3+CeO_2+MgO+Yb_2O_3$
$ZrO_2+Y_2O_3+MgO+HfO_2+Yb_2O_3$
$ZrO_2+Y_2O_3+HfO_2+CaO+Yb_2O_3$
$ZrO_2+Y_2O_3+CeO_2+HfO_2+Yb_2O_3$
$ZrO_2+Y_2O_3+MgO+CaO+Yb_2O_3$ $ZrO_2+Y_2O_3+CeO_2+CaO+Yb_2O_3$
$ZrO_2+Y_2O_3+CaO+CeO_2+HfO_2+Yb_2O_3$
$ZrO_2+Y_2O_3+HfO_2+MgO+CaO+Yb_2O_3$
$ZrO_2+Y_2O_3+CeO_2+MgO+CaO+Yb_2O_3$
$ZrO_2+Y_2O_3+CeO_2+MgO+HfO_2+Yb_2O_3$
$ZrO_2+Y_2O_3+HfO_2+CaO+CeO_2+MgO+Yb_2O_3$
$ZrO_2+Y_2O_3+CeO_2+Er_2O_3$
$ZrO_2+Y_2O_3+MgO+Er_2O_3$
$ZrO_2+Y_2O_3+HfO_2+Er_2O_3$
$ZrO_2+Y_2O_3+CaO+Er_2O_3$
$ZrO_2+Y_2O_3+CeO_2+MgO+Er_2O_3$
$ZrO_2+Y_2O_3+MgO+HfO_2+Er_2O_3$
$ZrO_2+Y_2O_3+HfO_2+CaO+Er_2O_3$
$ZrO_2+Y_2O_3+CeO_2+HfO_2+Er_2O_3$
$ZrO_2+Y_2O_3+MgO+CaO+Er_2O_3$
$ZrO_2+Y_2O_3+CeO_2+CaO+Er_2O_3$
$ZrO_2+Y_2O_3+CaO+CeO_2+HfO_2+Er_2O_3$
$ZrO_2+Y_2O_3+HfO_2+MgO+CaO+Er_2O_3$
$ZrO_2+Y_2O_3+CeO_2+MgO+CaO+Er_2O_3$
$ZrO_2+Y_2O_3+CeO_2+MgO+HfO_2+Er_2O_3$
$ZrO_2+Y_2O_3+HfO_2+CaO+CeO_2+MgO+Er_2O_3$
$ZrO_2+Y_2O_3+CeO_2+Yb_2O_3+Er_2O_3$
$ZrO_2+Y_2O_3+MgO+Yb_2O_3+Er_2O_3$
$ZrO_2+Y_2O_3+HfO_2+Yb_2O_3+Er_2O_3$ (particularly preferred)
$ZrO_2+Y_2O_3+CaO+Yb_2O_3+Er_2O_3$
$ZrO_2+Y_2O_3+CeO_2+MgO+Yb_2O_3+Er_2O_3$
$ZrO_2+Y_2O_3+MgO+HfO_2+Yb_2O_3+Er_2O_3$
$ZrO_2+Y_2O_3+HfO_2+CaO+Yb_2O_3+Er_2O_3$
$ZrO_2+Y_2O_3+CeO_2+HfO_2+Yb_2O_3+Er_2O_3$
$ZrO_2+Y_2O_3+MgO+CaO+Yb_2O_3+Er_2O_3$
$ZrO_2+Y_2O_3+CeO_2+CaO+Yb_2O_3+Er_2O_3$
$ZrO_2+Y_2O_3+CaO+CeO_2+HfO_2+Yb_2O_3+Er_2O_3$
$ZrO_2+Y_2O_3+HfO_2+MgO+CaO+Yb_2O_3+Er_2O_3$
$ZrO_2+Y_2O_3+CeO_2+MgO+CaO+Yb_2O_3+Er_2O_3$
$ZrO_2+Y_2O_3+CeO_2+MgO+HfO_2+Yb_2O_3+Er_2O_3$
$ZrO_2+Y_2O_3+HfO_2+CaO+CeO_2+MgO+Yb_2O_3+Er_2O_3$ The ceramic material comprises preferably 2.5 wt % to 5.5 wt % of yttrium oxide ($Y_2O_3$), more particularly 3.0 wt % to 5.0 wt % of yttrium oxide ($Y_2O_3$), especially 3.5 wt % to 4.0 wt %.

The ceramic material may also comprise preferably 1.5 wt % to 3.0 wt % of yttrium oxide ($Y_2O_3$), more particularly 2.0 wt % to 2.5 wt % of yttrium oxide ($Y_2O_3$).

The ceramic material preferably comprises: hafnium oxide ($HfO_2$) at 0.2 wt % to 4.0 wt %, more particularly 0.5 wt % to 4.0 wt % of hafnium oxide ($HfO_2$), especially 0.6 wt % to 4.0 wt % of hafnium oxide ($HfO_2$).

For better, i.e., lower, thermal conductivity, the ceramic material preferably comprises: hafnium oxide ($HfO_2$) at 0.2 wt % to 2.0 wt %, more particularly at 0.6 wt % to 2.0 wt % of hafnium oxide ($HfO_2$), especially at 0.8 wt % to 2.0 wt % of hafnium oxide ($HfO_2$).

For better thermal stability the ceramic material preferably comprises: hafnium oxide ($HfO_2$) at 2.0 wt % to 4.0 wt %, more particularly 2.4 wt % to 4.0 wt % of hafnium oxide ($HfO_2$), especially 4.0 wt % to 4.0 wt % of hafnium oxide ($HfO_2$).

The ceramic material preferably comprises 5.5 wt % to 8.5 wt % of ytterbium oxide ($Yb_2O_3$), more particularly 6.0 wt % to 8.0 wt % of $Yb_2O_3$, especially 6.5 wt % to 7.5 wt % of $Yb_2O_3$.

The ceramic material comprises preferably 3.0 wt % to 4.5 wt % of ytterbium oxide ($Yb_2O_3$), more particularly 3.5 wt % to 4.0 wt % of ytterbium oxide ($Yb_2O_3$).

The ceramic material also preferably comprises 2.0 wt % to 4.0 wt % of $Er_2O_3$, more particularly 2.5 wt % to 3.5 wt % of $Er_2O_3$.

With further preference the ceramic material comprises (6.0–x) wt % of $Y_2O_3$ and between 2*x wt % and 4*x wt % of $Yb_2O_3/Er_2O_3$. For example, when x corresponds to 2, the ceramic material would comprise 4.0 wt % of $Y_2O_3$ between 4 wt % and 8 wt %.

The invention claimed is:
1. A ceramic material based on zirconium oxide ($ZrO_2$) and comprising:
3.2 wt % to 8.0 wt % of base stabilizers, the base stabilizers comprising: 3.0 wt % to 5.0 wt % yttrium oxide ($Y_2O_3$), 0.2 wt % to 2.0 wt % hafnium oxide ($HfO_2$), and a remainder, the remainder comprising: cerium oxide ($CeO_2$), calcium oxide (CaO) and/or magnesium oxide (MgO), and
at least one additional stabilizer, the at least one additional stabilizer comprising 6.0 wt % to 8.0 wt % of ytterbium oxide ($Yb_2O_3$).
2. The ceramic material as claimed in claim 1, comprising:
3.5 wt % to 4.0 wt % of yttrium oxide ($Y_2O_3$).
3. The ceramic material as claimed in claim 1, comprising:
6.5 wt % to 7.5 wt % of ytterbium oxide ($Yb_2O_3$).
4. A ceramic powder comprising,
a composition of the ceramic material as claimed in claim 1.
5. A layer system at least comprising:
a metallic substrate,
optionally a metallic adhesion promoter layer, and
at least one ceramic layer based on the ceramic material as claimed in claim 1.
6. The layer system as claimed in claim 5, comprising:
the metallic adhesion promoter layer between the at least one ceramic layer and directly on the metallic substrate,
wherein the metallic adhesion promoter layer comprises an alloy of the type NiCoCrAlY—X, where X is optional and can be Ta, Re and/or Si.
7. The layer system as claimed in claim 5,
wherein a ceramic sublayer is present below the at least one ceramic layer,
which more particularly is at least 20% thinner than the at least one ceramic layer and comprises yttrium-stabilized zirconium oxide (YSZ).
8. The layer system as claimed in claim 7, which comprises a segmentation comprising,
vertical cracks in the ceramic sublayer.
9. The layer system as claimed in claim 8,
in which the segmentation is present by means of vertical cracks only in an outermost ceramic layer of the at least one ceramic layer.
10. The layer system as claimed in claim 8,
in which the segmentation runs by means of vertical cracks through the ceramic sublayer and one ceramic layer of the at least one ceramic layer.
11. The layer system as claimed in claim 10,
in which a number of vertical cracks extend from a surface of the at least one ceramic layer up to the metallic adhesion promoter layer.
12. The layer system as claimed in claim 8,
in which numerous vertical cracks extend up to the metallic adhesion promoter layer.
13. A ceramic material based on zirconium oxide ($ZrO_2$) and comprising:
2.0 wt % to 5.0 wt % yttrium oxide ($Y_2O_3$);
0.2 wt % to 2.0 wt % hafnium oxide ($HfO_2$); and
6.0 wt % to 8.0 wt % of ytterbium oxide ($Yb_2O_3$).

* * * * *